United States Patent
Lu et al.

(10) Patent No.: US 11,520,961 B2
(45) Date of Patent: Dec. 6, 2022

(54) HETEROGENEOUS-COMPUTING BASED EMULATOR

(71) Applicant: International Business Machines Corporation, Armonk, NY (US)

(72) Inventors: Yan Heng Lu, Shanghai (CN); Heng Liu, Shanghai (CN); He Wang, Shanghai (CN); Chen Qian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 16/679,533

(22) Filed: Nov. 11, 2019

(65) Prior Publication Data

US 2021/0141868 A1    May 13, 2021

(51) Int. Cl.
*G06F 9/455*    (2018.01)
*G06F 30/331*    (2020.01)
*G06F 11/26*    (2006.01)
*G01R 31/317*    (2006.01)
*G06F 9/30*    (2018.01)
*G01R 31/3185*    (2006.01)
(Continued)

(52) U.S. Cl.
CPC ..... *G06F 30/331* (2020.01); *G01R 31/31727* (2013.01); *G01R 31/318519* (2013.01); *G06F 9/30101* (2013.01); *G06F 9/544* (2013.01); *G06F 11/261* (2013.01); *G06F 30/34* (2020.01)

(58) Field of Classification Search
USPC ..... 714/37, 733; 716/108, 134, 136; 703/21, 703/23
See application file for complete search history.

(56) References Cited

U.S. PATENT DOCUMENTS 6,785,873 B1 *   8/2004   Tseng .................... G06F 30/33
                                                     716/108
8,248,869 B1 *   8/2012   Chan .................... G11C 7/1012
                                                     365/194
(Continued)

FOREIGN PATENT DOCUMENTS

JP          2004199425 A   *   7/2004
WO    WO-2009039462 A1   *   3/2009   ......... G01R 31/3177

OTHER PUBLICATIONS

"Method and Apparatus to Verify a Hardware Design using an FPGA Platform with Intelligent Load leveler Capabilities", Disclosed Anonymously, An IP.com Prior Art Database Technical Disclosure, IP.com No. IPCOM000239377D, IP.com Electronic Publication Date: Nov. 3, 2014, 4 pages, https://priorart.ip.com/IPCOM/000239377>.

(Continued)

Primary Examiner — Brian Ngo
(74) Attorney, Agent, or Firm — Edward J. Wixted, III

(57) ABSTRACT

In an approach, a processor receives an input indicative of a set of registers, the set of registers being configured for obtaining output data from a design-under-test (DUT) in a field-programmable gate array (FPGA) module. A processor executes a set of instructions for monitoring the output data in the set of registers;. A processor generates data indicative of at least one portion of changes of the output data in the set of registers during the execution of the set of instructions. A processor causes a separate machine to analyze the data via utilizing an interface to send the data to the separate machine.

20 Claims, 8 Drawing Sheets

(51) Int. Cl.
   *G06F 9/54*      (2006.01)
   *G06F 30/34*     (2020.01)

(56) References Cited

U.S. PATENT DOCUMENTS

| | | |
|---|---|---|
| 9,418,187 B2 | 8/2016 | Foisy et al. |
| 9,703,579 B2 | 7/2017 | Suresh et al. |
| 10,169,505 B2 | 1/2019 | Lepereq et al. |
| 2007/0050693 A1* | 3/2007 | Kiryu ............. G01R 31/318566 714/733 |
| 2011/0307233 A1* | 12/2011 | Tseng ..................... G06F 30/33 703/21 |
| 2015/0261638 A1* | 9/2015 | Drapala ................. G11C 29/04 714/37 |
| 2018/0113976 A1 | 4/2018 | Suresh et al. |
| 2018/0349533 A1 | 12/2018 | Wakefield et al. |

OTHER PUBLICATIONS

Mell et al., "The NIST Definition of Cloud Computing", Recommendations of the National Institute of Standards and Technology, Special Publication 800-145, Sep. 2011, 7 pages.

Taatizadeh et al., "Emulation Infrastructure for the Evaluation of Hardware Assertions for Post-Silicon Validation", IEEE Transactions on Very Large Scale Integration (VLSI) Systems, vol. 25, No. 6, Jun. 2017, 15 pages, https://ieeexplore.ieee.org/document/7851081?denied=>.

* cited by examiner

HETEROGENEOUS-COMPUTING BASED EMULATOR

BACKGROUND

The present invention relates to the field of emulators and, more specifically, to a heterogeneous-computing based emulator.

Currently, hardware design verification is much more time consuming with the increase of the design scale. Emulators are often used to accelerate the verification flow.

SUMMARY

Aspects of an embodiment of the present invention disclose a method, computer program product, and computer system. A processor receives an input indicative of a set of registers, the set of registers being configured for obtaining output data from a design-under-test (DUT) in a field-programmable gate array (FPGA) module. A processor executes a set of instructions for monitoring the output data in the set of registers;. A processor generates data indicative of at least one portion of changes of the output data in the set of registers during the execution of the set of instructions. A processor causes a separate machine to analyze the data via utilizing an interface to send the data to the separate machine.

DETAILED DESCRIPTION

Figure 1:
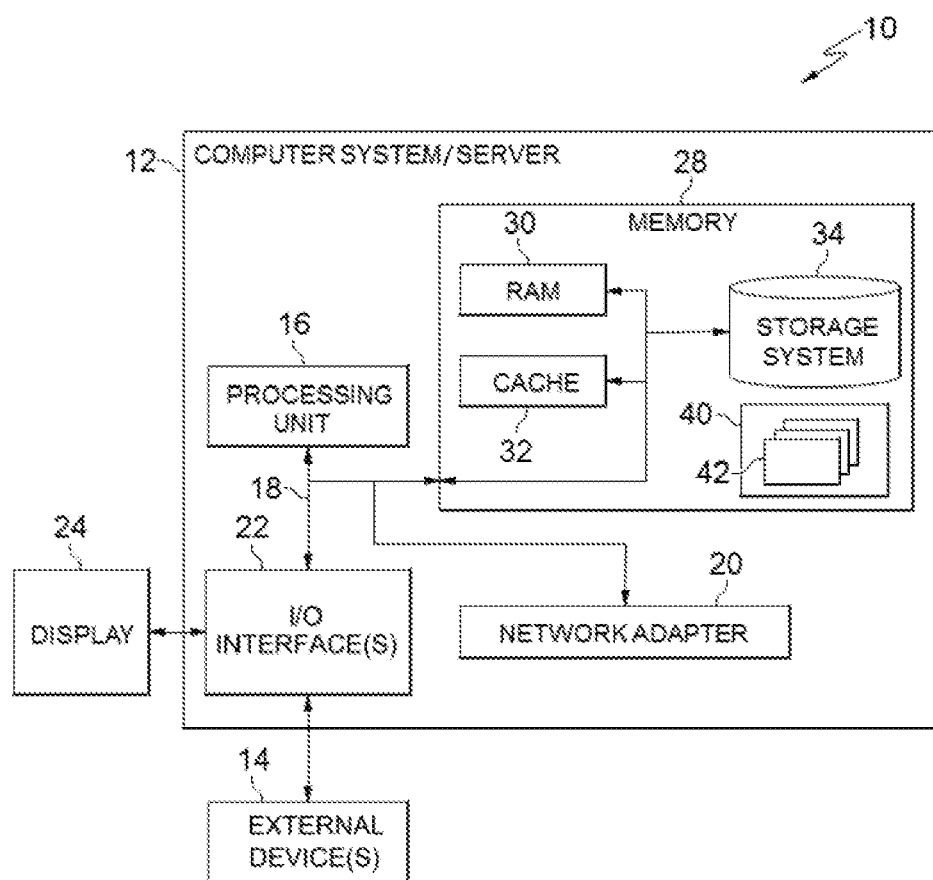
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
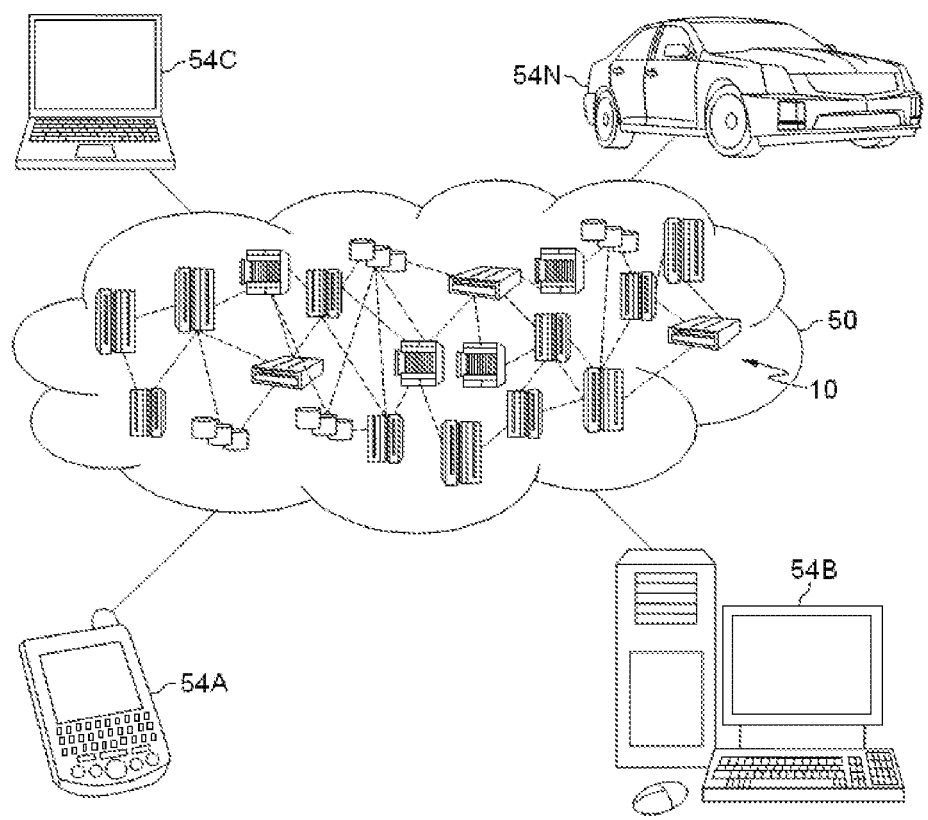
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
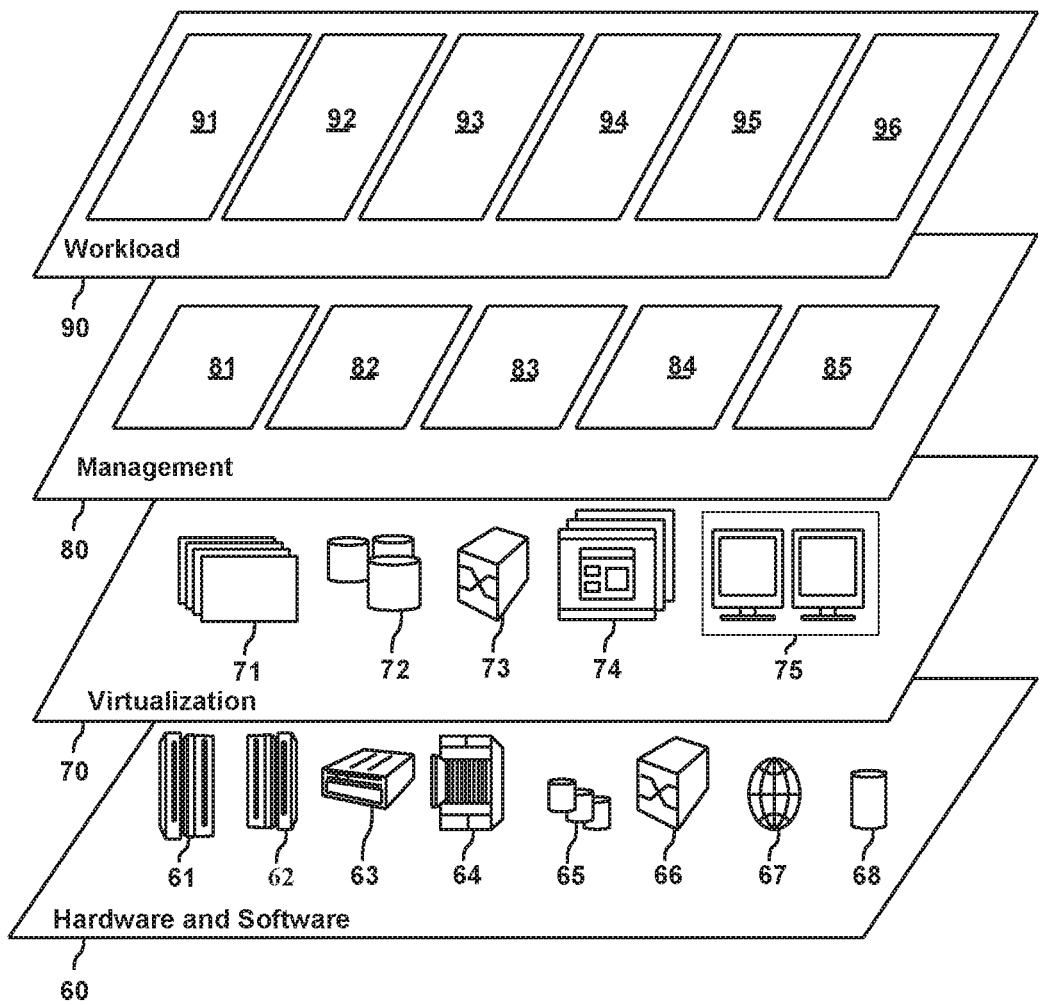
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and signal emulating with heterogeneous computing architecture 96.

Figure 4A:
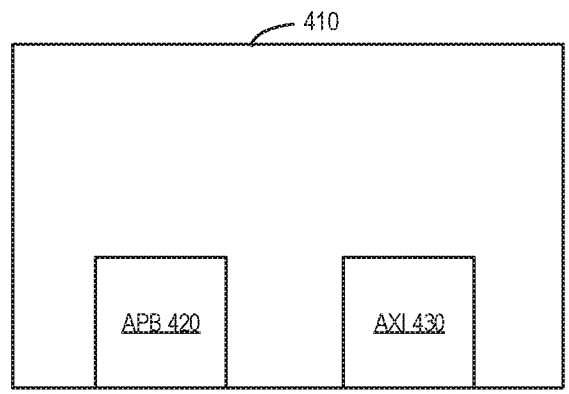
FIGS. 4A and 4B depict architecture of emulators according to conventional technologies.
Figure 4B:
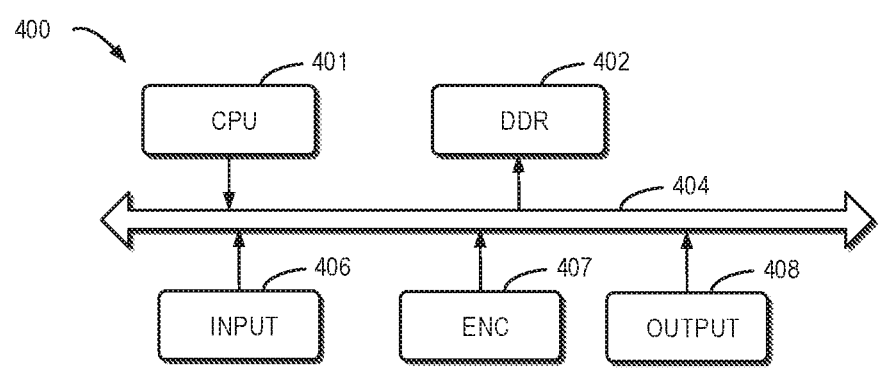

Reference is now made to FIG. 4A, which depicts a schematic diagram of H265 encoder Internet Protocol (IP) 410. As shown in FIG. 4A, the H265 encoder IP 410 comprises an Advanced Peripheral Bus 420 and an Advanced eXtensible Interface (AXI) interface 430. Conventionally, a system-on-chip (SoC) platform is required to test the H265 encoder IP 410. FIG. 4B illustrates a platform 400 of testing the encoder IP. As shown in FIG. 4B, the platform 400 comprises a Central Processing Unit (CPU) 401, a Double Data Rate Synchronous Dynamic random-access memory (SDRAM) 402, an input unit 406, an output unit 408, and an Ethernet Cash (ENC) unit 407. The H265 encoder IP 410 needs to be placed on ENC unit 407 and connect with the input unit 406 and output unit 408. The units/elements are interconnected with each other via a bus 404. It is very complex and time consuming to set up the platform 400. Further, it is difficult to monitor the signals for debugging.

According to embodiments of the present invention, the FPGA module monitors a signal and the separate machine is able to obtain data concerning the monitored signal through the interface. The separate machine analyzes the data to test the operation of the design under test (DUT). The FPGA module and the separate machine 530 work together as a heterogeneous-computing based emulator. In this way, it is suitable for hardware and software cooperated applications. Further, the platform including the separate machine and the FPGA module for testing makes it easy to monitor the internal signals of the FPGA because of high interface bandwidth. The heterogeneous-computing based emulator, according to embodiments of the present disclosure, is much cheaper than conventional emulators.

Figure 5:
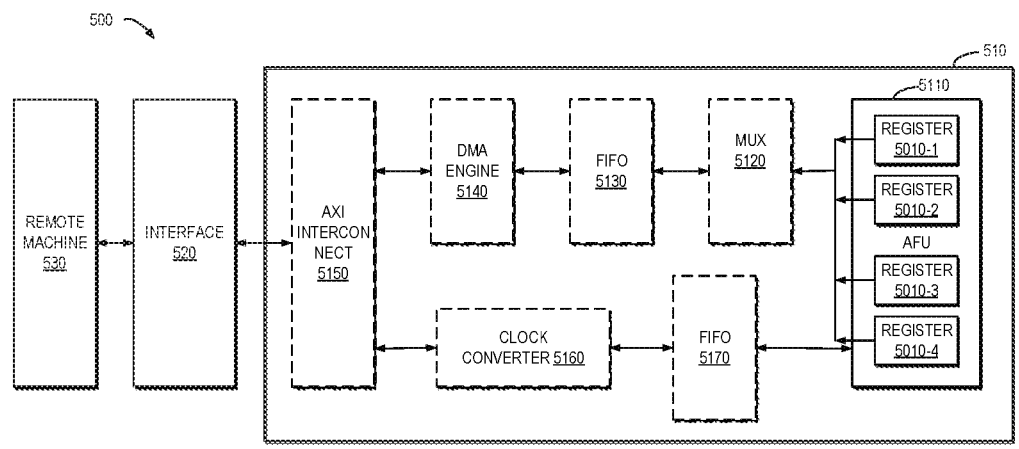
FIG. 5 depicts a system of a heterogeneous-computing based emulator according to an embodiment of the present invention.

FIG. 5 depicts a system 500 of a heterogeneous-computing based emulator according to an embodiment of the present invention. As shown in FIG. 5, the system 500 comprises a FPGA module 510, an interface 520, and a remote machine 530 (e.g., a server). Only for the purpose of illustrations, the remote machine 530 may be described as the server 530. The interface 520 is a communication medium that allows communication between the FPGA module 510 and the server 530. The interface 520 may be an AXI. Alternatively or in addition, the interface 520 may be an AXI lite. In one embodiment, the interface 520 is one or more cables with electrical connections. For example, the interface 520 may be one or more Universal Serial Bus (USB), local area network (LAN), optical, Institute of Electrical and Electronic Engineers (IEEE) 1394 (FireWire), or custom-built cables. In a further embodiment, the interface 520 is a wireless communication medium or a network with one or more points of access. For example, the interface 520 may be a wireless communication medium which follows, for example, a Bluetooth® or IEEE 802.11 protocol. In one embodiment, the interface 520 is enabled during the operation of the FPGA module 510 and the server 530. In one embodiment, the interface 520 is only enabled when the FPGA module 510 and the server 530 need to exchange information with each other. It should be noted that the interface 520 may be any suitable interfaces that can connect the FPGA module 510 and the server 530.

The server 530 may be with various components, such as, a network driver, a video input unit, a data process unit and the like. The FPGA module 510 may implement a DUT to be tested. The FPGA module 510 may comprise one or more components for implementing the DUT. For example, the FPGA 510 may comprise an accelerator functional unit (AFU) 5110 which may store one or more registers, such as registers 5010-1, 5010-2, 5010-3, 5010-4, and so on. It should be noted that the components of the system 500 shown in FIG. 5 are only examples and the system 500 may comprise any suitable components. Embodiments of the invention are not limited in this aspect. Details will be described with reference to other figures later.

Figure 6:
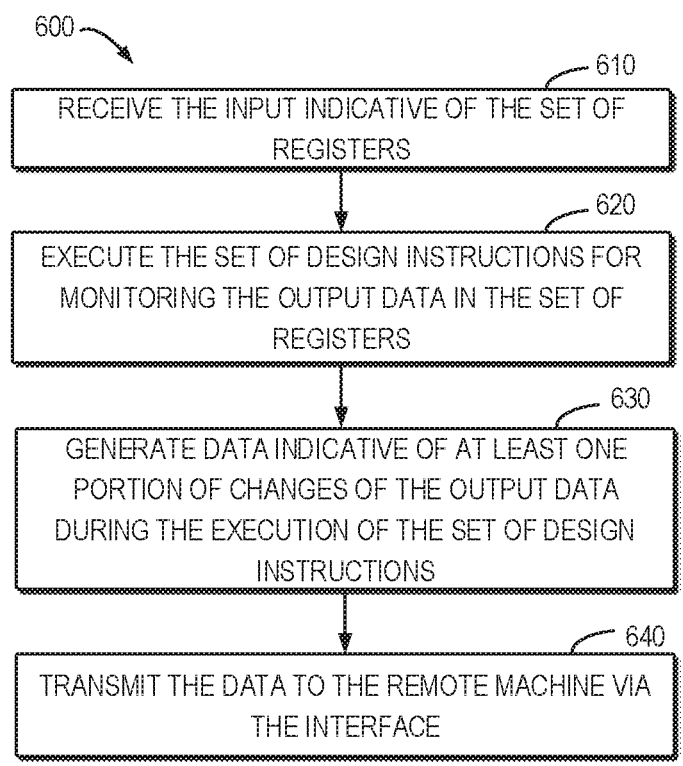
FIG. 6 depicts a flow chart according to an embodiment of the present invention.

Some operations and functionalities of embodiments of the present disclosure will now be discussed with reference to FIG. 6 where a flowchart of a method 600 for emulating signals is shown. The method 600 can be implemented by the system 500 as shown in FIG. 5, especially implemented at the FPGA module 510. It is to be understood that the blocks shown in dash line are optional.

At block 610, the FPGA module 510 receives an input indicative of a set of registers. The set of registers are configured to obtain the output data from the DUT. In some embodiments, a list of registers may be defined by a user in the FPGA module 510, for example, the registers 5010-1, 5010-2, 5010-3 and 5010-4 (collectively or individually referred to as registers 5010). The number of registers may be any suitable number.

At block 620, the FPGA module 510 executes a set of instructions for monitoring the output data in the set of registers. The instructions may be configured for different purpose. In some embodiments, the instructions may be configured by the user. The instructions may be used for monitoring the set of registers per clock cycle. Alternatively, or in addition, the instructions may be used for monitoring the set of registers in real time. In other embodiments, the instructions may be used for monitoring the set of registers at one or more checkpoints. In this way, it is suitable for hardware and software cooperated applications and easy to monitor internal signals. Embodiments of implementing the design instructions will describe later with the reference to FIGS. 7 and 8. In some embodiments, the FPGA module 510 may generate one or more logics in the FPGA 510 to execute the set of instructions.

At block 630, the FPGA module 510 generates data indicative of at least one portion of changes of the output data in the set of registers 5010 during the execution of the set of instructions. For example, the FPGA module 510 may generate the data indicating the values of signals from the registers 5010. The values of signals form the registers 5010 may be varied with time.

At block 640, the FPGA module 510 transmits the data to the separate machine 530 via the interface 520 so that the separate machine 530 is able to analyze the data. The data in the FIFO buffer 5130 may be written to the memory of the separate machine 530 by, for example, the DMA engine 5140 in the FPGA module 510. The FPGA module 510 may write the data via the interface 520, for example, the AXI. In some embodiments, the FPGA module 510 may disable the clock after transmitting the data to the separate machine 530. In this way, the FPGA 510 and the separate machine 530 can work together to implement the emulation, thereby saving computing time.

In some embodiments, the separate machine 530 may generate a waveform based on the data from the FPGA module 510. In an example embodiment, the separate machine 530 may determine the one or more checkpoints based on the data from the FPGA 510. The separate machine 530 may read the data at the determined checkpoints. The separate machine 530 may also write the data at the determined checkpoints to the registers 5010.

Embodiments of the present disclosure can remarkably reduce testing time. It is also more suitable for hardware-software cooperated applications. Further, the platform for testing is easy to monitor the internal signals because of high interface bandwidth. The heterogeneous-computing based emulator according to embodiments of the present disclosure is much cheaper than conventional emulators. Embodiments of the present disclosure can be not only a verification tool but also one potential implementation method.

Figure 7:
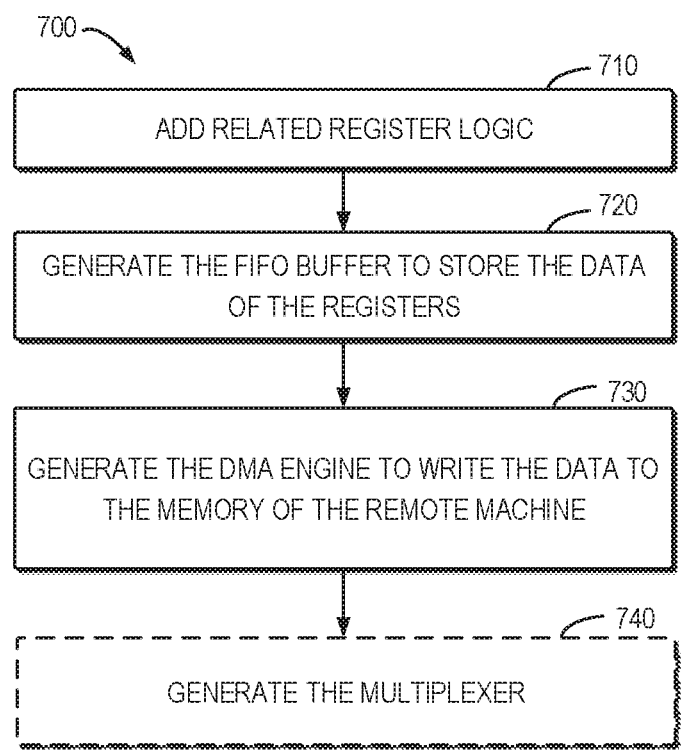
FIG. 7 depicts a flow chart according to an embodiment of the present invention.
Figure 8:
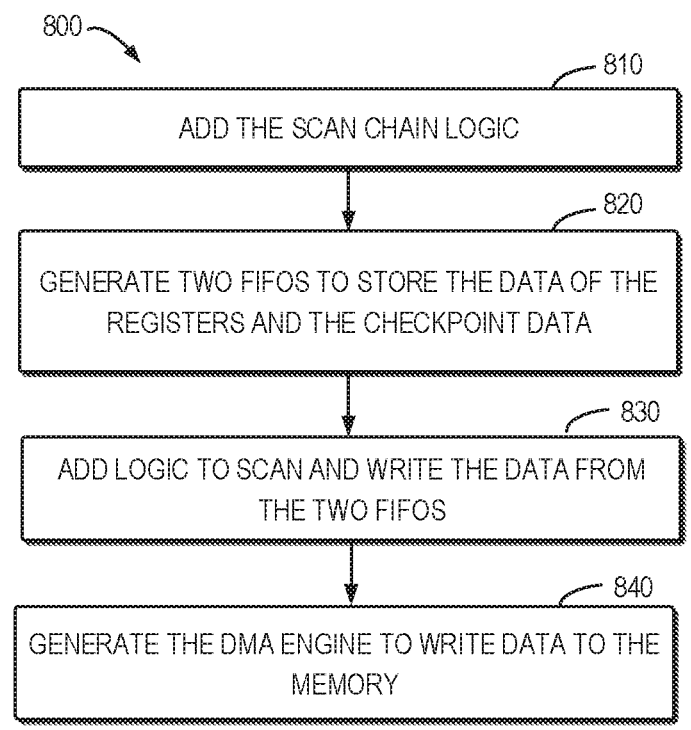
FIG. 8 depicts a flow chart according to an embodiment of the present invention.

FIGS. 7 and 8 illustrate flow charts of implementing instructions. In some embodiments, the set of instructions may be used to monitor the registers in real time. By way of example, FIG. 7 shows a flow chart of a method 700 for inserting logic to implement monitoring the registers in real time. The method 700 can be implemented by the system 500 as shown in FIG. 5.

At block 710, the FPGA module 510 adds one or more related register logics. For example, the one or more related register logics may be used to write the data out to other logics.

At block 720, the FPGA module 510 generates a First-Input-First-Output (FIFO) buffer 5130 to store the output data in the registers 5010 which is from the DUT. As shown in FIG. 5, the FIFO buffer 5130 may be connected to the AFU 5110 to store the output data in the registers 5010 in the AFU 5110. In this way, the registers 5010 can be monitored in real time. The size of the FIFO buffer 530 may be determined based on the number of the registers 5010 to be monitored. Alternatively, the size of the FIFO buffer 530 may also be determined based on the data volume of the registers 5010.

At block 730, the FPGA module 510 generates a Direct Memory Access (DMA) engine 5140. The DMA engine 5140 may be used to write the output data in the FIFO buffer 5130 to a memory of the separate machine 530 through the interface 520.

In some embodiments, the design for monitoring the registers may be large and the FPGA module 510 may generate, at block 740, a multiplexer (MUX) 5120. The multiplexer 5120 may be arranged between the FIFO buffer 5130 and the AFU 5110. In this way, the registers 5010 can be monitored at different times by means of the multiplexer 5120.

In an embodiment, the FPGA module 510 may also comprise a clock converter 5160. The clock converter 5160 may be used to reduce the working frequency of the FPGA module 510. Since a part of the frequency band is used to monitor the data, the clock converter 5160 is used to reduce the working frequency of the FPGA module 510.

Alternatively, or in addition, the set of design instructions may be used to monitor the output data in the registers at one or more checkpoints. In some embodiments, the output data may be monitored at one or more checkpoints. The one or more checkpoints may be determined by the user. For example, the user may input the one or more checkpoints to the FPGA module 510. The FPGA module 510 may link up the set of registers 5010 and store the output data in the set of registers in a buffer.

Only as an example, FIG. 8 shows a flow chart of a method 800 for inserting logic to implement monitoring the registers at one or more checkpoints.

At block 810, the FPGA module 510 adds scan chain logic. The scan chain logic may be used to link up all the registers 5010. For example, the start of the register 5010-4 connects to the end of the register 5010-3 and the start of the register 5010-3 connects to the end of the register 5010-2. Similarly, the start of the register 5010-2 connects to the end of the register 5010-1. Thus, the registers are linked up.

At block 820, the FPGA module 510 creates two FIFOs (for example, the FIFO buffers 5130 and 5170) to store the output data in the registers 5010 and the output data at one or more checkpoints, respectively. For example, the FIFO buffer 5130 may be used to store the output data in the registers 5010 and the FIFO buffer 5170 may be used to store the output data at one or more checkpoints.

At block 830, the FPGA module 510 adds logic to scan and write the data from the two FIFO buffers 5130 and 5170. The logic may also be used to read the data from the two FIFO buffers 5130 and 5170.

At block 840, the FPGA module 510 generates a Direct Memory Access (DMA) engine 5140. The DMA engine 5140 may be used to write the data in the FIFO 5130 to a memory of the separate machine 530 through the interface 520.

In some embodiments, if the signals are monitored in all, the FPGA module 510 may duplicate the output data in the set of registers 5010 to a further set of registers readable by the interface 520. The interface 520 may be an AXI Lite. In this situation, the FPGA module 510 may insert a clock gating logic and disable the clock while the separate machine 530 analyzes the output data from the DUT.

In some embodiments, the output data in the set of registers 5010 may be monitored in real time. In this example, the FPGA module 510 may store the values of the set of registers 5010 in the FIFO buffer 5130.

It should be noted that the processing of heterogeneous-computing based emulation or achieved by the heterogeneous-computing based emulator according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an input indicative of a set of registers, the set of registers configured for obtaining output data from a design-under-test (DUT) connected to a field-programmable gate array (FPGA) module;
   generating a First-Input-First-Output (FIFO) buffer to store the output data of the set of registers;
   generating a Direct Memory Access (DMA) engine to write the output data in the FIFO buffer to a separate machine;
   executing a set of instructions for monitoring the output data in the set of registers;
   generating data indicative of at least one portion of changes of the output data in the set of registers during the execution of the set of instructions;
   transmitting the data to the separate machine via an Advanced eXtensible Interface (AXI);
   subsequent to transmitting the data to the separate machine, disabling a clock; and
   causing the separate machine to analyze the transmitted data.

2. The method of claim 1, wherein executing the set of instructions comprises:
   duplicating the output data in the set of registers to a further set of registers readable by the interface.

3. The method of claim 1, wherein disabling the clock comprises:
   inserting a clock gating logic in the DUT; and
   subsequent to transmitting the data to the separate machine, disabling the clock for the DUT.

4. The method of claim 1, wherein executing the set of instructions comprises:
   storing the output data in the set of registers into the FIFO buffer; and
   transmitting the output data in the FIFO buffer to a memory of the separate machine via the AXI.

5. The method of claim 1, further comprising:
   monitoring the set of registers at different times.

6. The method of claim 4, further comprising:
   reducing a working frequency of the FPGA module.

7. The method of claim 1, wherein executing the set of instructions comprises:
   linking up the set of registers;
   storing the output data in the set of registers to the FIFO buffer;
   transmitting the output data to a memory of the separate machine;
   reading further data at a checkpoint from the memory of the separate machine; and
   storing the further data to a second FIFO buffer.

8. The method of claim 1, wherein causing the separate machine to analyze the data further comprises causing the separate machine to generate a waveform based on the data.

9. A computer program product comprising:
   one or more computer readable storage media, and program instructions collectively stored on the one or more computer readable storage media, the program instructions comprising:
   program instructions to receive an input indicative of a set of registers, the set of registers configured for obtaining output data from a design-under-test (DUT) connected to a field-programmable gate array (FPGA) module;
   program instructions to generate a First-Input-First-Output (FIFO) buffer to store the output data of the set of registers;
   program instructions to generate a Direct Memory Access (DMA) engine to write the output data in the FIFO buffer to a separate machine;
   program instructions to execute a set of instructions for monitoring the output data in the set of registers;
   program instructions to generate data indicative of at least one portion of changes of the output data in the set of registers during the execution of the set of instructions;
   program instructions to transmit data to the separate machine via Advanced eXtensible Interface (AXI);
   program instructions to, subsequent to transmitting the data to the separate machine, disable a clock; and
   program instructions to cause the separate machine to analyze the transmitted data.

10. The computer program product of claim 9, wherein program instructions to execute the set of instructions comprise:
    program instructions to duplicate the output data in the set of registers to a further set of registers readable by the interface.

11. The computer program product of claim 9, wherein program instructions to disable the clock comprise:
    program instructions to insert a clock gating logic in the DUT; and
    program instructions to, subsequent to transmitting the data to the separate machine, disable the clock for the DUT.

12. The computer program product of claim 9, wherein program instructions to execute the set of instructions comprise:
    program instructions to store the output data in the set of registers into the FIFO buffer; and program instructions to transmit the output data in the FIFO buffer to a memory of the separate machine via the AXI.

13. The computer program product of claim 9, further comprising:
program instructions, collectively stored on the one or more computer readable storage media, to monitor the set of registers at different times.

14. The computer program product of claim 12, further comprising:
program instructions, collectively stored on the one or more computer readable storage media, to reduce a working frequency of the FPGA module.

15. The computer program product of claim 9, wherein program instructions to execute the set of instructions comprise:
program instructions to link up the set of registers;
program instructions to store the output data in the set of registers to the FIFO buffer;
program instructions to transmit the output data to a memory of the separate machine;
program instructions to read further data at a checkpoint from the memory of the separate machine; and
program instructions to store the further data to a second FIFO buffer.

16. A computer system comprising:
one or more computer processors, one or more computer readable storage media, and program instructions collectively stored on the one or more computer readable storage media for execution by at least one of the one or more computer processors, the program instructions comprising:
program instructions to receive an input indicative of a set of registers, the set of registers configured for obtaining output data from a design-under-test (DUT) connected to a field-programmable gate array (FPGA) module;
program instructions to generate a First-Input-First-Output (FIFO) buffer to store the output data of the set of registers;
program instructions to generate a Direct Memory Access (DMA) engine to write the output data in the FIFO buffer to a separate machine;
program instructions to execute a set of instructions for monitoring the output data in the set of registers;
program instructions to generate data indicative of at least one portion of changes of the output data in the set of registers during the execution of the set of instructions;
program instructions to transmit data to the separate machine via Advanced eXtensible Interface (AXI);
program instructions to, subsequent to transmitting the data to the separate machine, disable a clock; and
program instructions to cause the separate machine to analyze the transmitted data.

17. The computer system of claim 16, wherein program instructions to execute the set of instructions comprise:
program instructions to duplicate the output data in the set of registers to a further set of registers readable by the interface.

18. The computer system of claim 16, further comprising wherein program instructions to disable the clock comprise:
program instructions to insert a clock gating logic in the DUT; and
program instructions to, subsequent to transmitting the data to the separate machine, disable the clock for the DUT.

19. The computer system of claim 16, wherein program instructions to execute the set of instructions comprise:
program instructions to store the output data in the set of registers into the FIFO buffer; and
program instructions to transmit the output data in the FIFO buffer to a memory of the separate machine via the AXI.

20. The computer system of claim 19, further comprising:
program instructions, collectively stored on the one or more computer readable storage media for execution by at least one of the one or more computer processors, to reduce a working frequency of the FPGA module.

* * * * *